United States Patent [19]

Hirschmann

[11] Patent Number: 4,885,996

[45] Date of Patent: Dec. 12, 1989

[54] APPARATUS FOR HANDLING AN ASSEMBLY SYSTEM HAVING A CARRIER MEMBER AND A SLIDE UNIT

[76] Inventor: Gregory C. Hirschmann, Rautistrasse 12, Zurich, Switzerland

[21] Appl. No.: 232,628

[22] Filed: Aug. 15, 1988

[30] Foreign Application Priority Data

Aug. 27, 1987 [CH] Switzerland .......................... 3320/87

[51] Int. Cl.[4] .............................................. B66C 11/16
[52] U.S. Cl. .................................... 104/134; 104/139; 105/29.1; 191/12 R
[58] Field of Search ............... 104/134, 139; 105/29.1; 191/12 R; 901/16; 212/214, 216

[56] References Cited

U.S. PATENT DOCUMENTS 4,207,821 6/1980 Beckert ........................... 105/29.1 X Primary Examiner—Johnny D. Cherry
Assistant Examiner—Dean J. Kramer
Attorney, Agent, or Firm—Helfgott & Karas

[57] ABSTRACT

An apparatus for a handling assembly comprises at least one carrier member and at least one slide unit displaceably arranged on the carrier member. The slide unit is in operative connection via a cable drag member electrically/pneumatically or electrically/hydraulically with an energy and a signal source. The carrier member is a one-piece cellular structure and has an integrated guideway which, has an inclined position within the carrier member, so that a space-saving arrangement of the cable drag member, substantially protected against external action, is obtained. The slide unit comprises a driving unit, which is arranged in a U-shaped head guided with the lateral legs on the carrier member and is operatively connected with a rack arranged on the carrier member, for linear movement. Protective members are provided laterally on the carrier member. The slide unit together with the carrier member forms a closed system protected against external action or intervention.

16 Claims, 3 Drawing Sheets

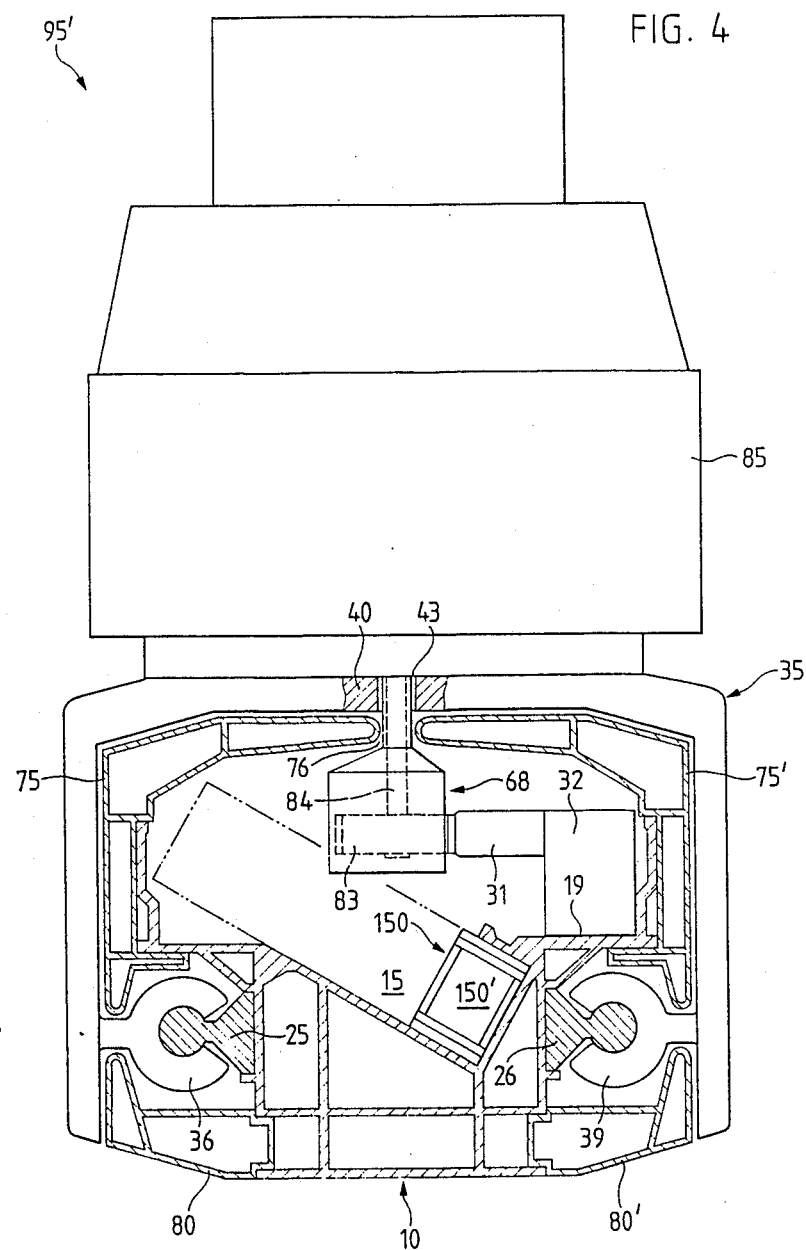

APPARATUS FOR HANDLING AN ASSEMBLY SYSTEM HAVING A CARRIER MEMBER AND A SLIDE UNIT

BACKGROUND OF THE INVENTION

The invention relates to an apparatus for handling an assembly system, comprising a carrier member constructed as a guideway and at least one slide unit linearly adjustable thereon, said slide unit being operatively connected by means of a cable towing or drag member electrically/pneumatically or electrically/hydraulically with an energy and signal source and is constructed as an attachment to the carrier member for further peripheral means to be correspondingly operated.

For automating random, e.g. signal-dependent-given movements and handling sequences, correspondingly constructed assembly systems are known, in which a slide unit designed for receiving one or more working members is linearly adjustable on or at a respectively designed carrier member. The energy or electric control signals necessary for the individual movement and/or other handling sequences are essentially supplied by means of a cable drag chain or the like arranged laterally on the carrier member to the slide unit and by means of further, substantially free flexible cables or lines to the correspondingly associated handling member (gripper or the like).

SUMMARY OF THE INVENTION

It is an object of the present invention to provide an apparatus of the aforementioned type which, whilst retaining a comparatively simple construction ensures a better energy supply and which is protected against external action.

Briefly, in accordance with the invention this and other objects are attained by an apparatus comprising a carrier member constructed as a one-piece rigid cellular element formed by several spaced bases and side walls passing through the carrier member along the length thereof and arranged between two upper vertical side walls, a guideway for receiving a cable drag member passing through the carrier member along the length thereof, a base connected to one side of the guideway for receiving a rack and guide members for mounting a slide unit arranged laterally on two lower vertical side walls, and a slide unit which comprises a casing for receiving a drive unit in operative connection with the rack and a head for receiving the casing, said head being of U-shaped cross-section for substantially surrounding the casing and the carrier member and being displaceably mounted with its legs on the guide members of the carrier member.

In an embodiment, the carrier member forms a closed arrangement protected against external action by means of respectively formed side walls or protective elements detachably arranged on the carrier member, in which outwardly directed webs of the slide unit are in each case arranged and substantially guided in a slot-like gap passing through the carrier member in the longitudinal direction thereof.

Further advantageous developments and features of the invention can be defined from the claims and the following description relative to the drawings.

BRIEF DESCRIPTION OF THE DRAWINGS

FIG. 4 is a partially sectional view similar to that of FIG. 3 of a modified embodiment of the slide unit for the guideway of the assembly system.

DETAILED DESCRIPTION OF THE PREFERRED EMBODIMENTS

Figure 1:
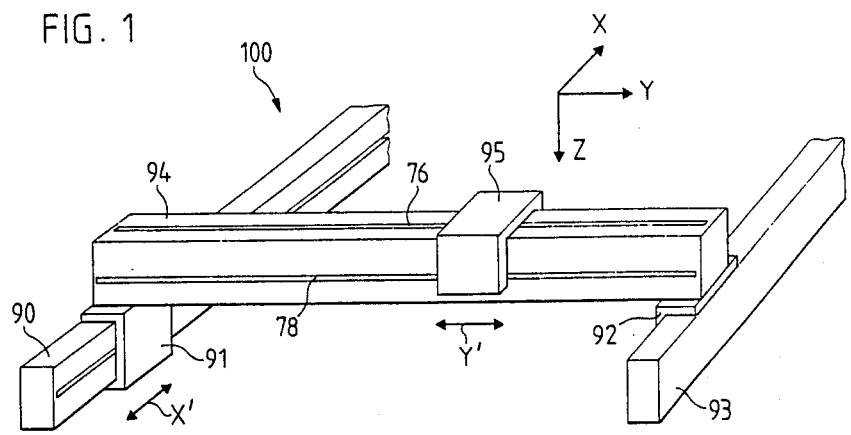
FIG. 1 is a diagrammatic perspective view of an assembly system.

FIG. 1 diagrammatically shows a handling assembly system known per se, in a modular construction and designated overall by reference numeral 100. The assembly system includes two parallel, spaced guideways 90,93, on which is arranged a third guideway 94 extended substantially at right angles thereto. The two guideways 90,93 extend along a first coordinate axis X and the third guideway 94 along a second coordinate axis Y. At least one slide unit 91, 92 or 95 is arranged on each of the guideways 90,93 and 94. In the exemplified embodiment, two slide units 91,92 are provided for a translation of the third guideway 94, operatively connected in not shown manner therewith and one slide unit 95 in the direction of arrow X'. Slide unit 95 is constructed for an independent translation in arrow direction Y'. Slide unit 95 movable in direction Y' can be constructed for receiving and fixing a linear unit movable in arrow direction Z, and on the linear unit can be arranged a non-shown gripper member or the like. However, the non-shown gripper member can also be arranged and fixed directly to the slide unit 95.

The guideways 90,93 in FIG. 1 can be used with the slide unit 90,91,92 arranged laterally thereon for the particular movement and/or handling sequences as individual subassemblies in accordance with the requirements to the assembly system.

Figure 2:
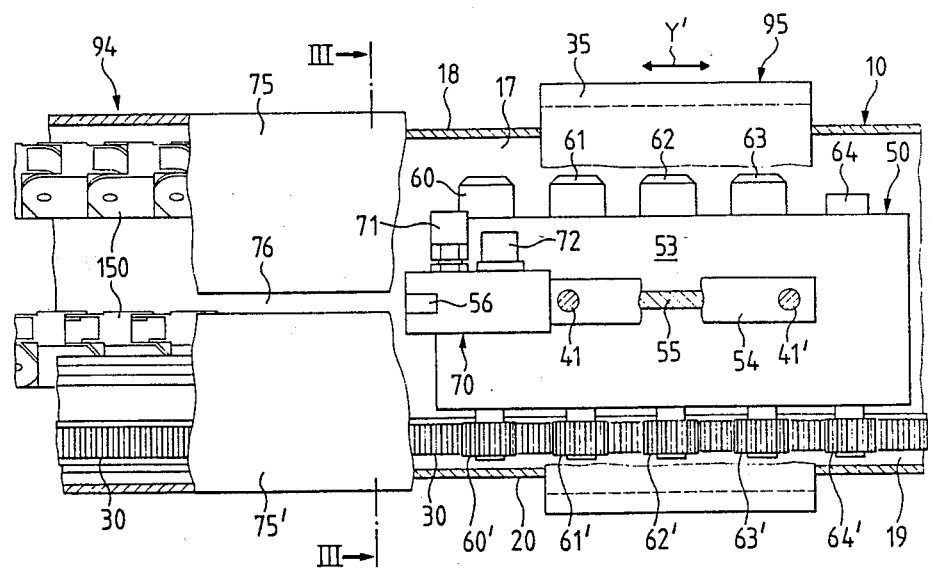
FIG. 2 is a plan view of a part of a guideway with a slide unit according to the invention for the assembly system according to FIG. 1.
Figure 3:
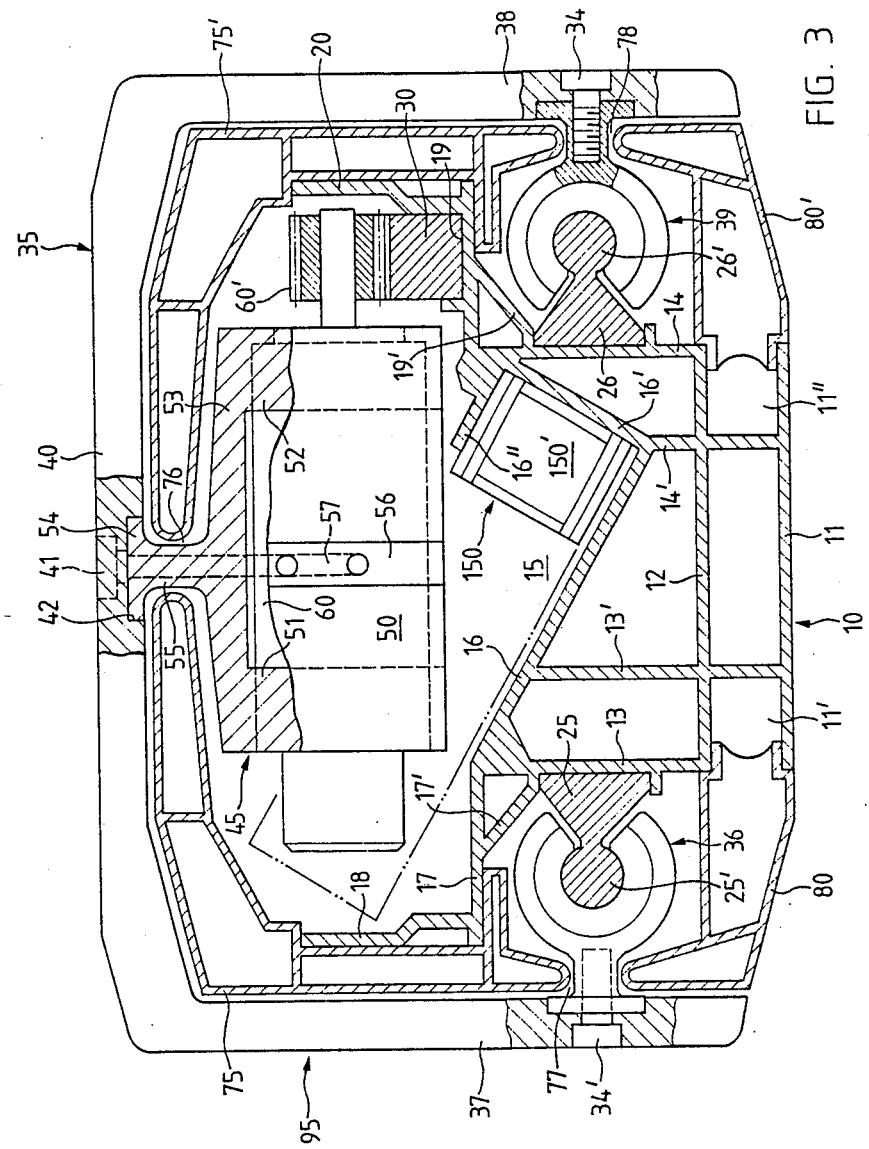
FIG. 3 is a sectional view taken along line III—III in FIG. 2.

With reference to FIGS. 2 and 3, it will be seen that a guideway 94 is constructed as an individual functional unit, together with the slide unit 95 arranged thereon and can be moved along the same direction of arrow Y'. Guideway 94 has a fixed carrier member 10 extending over its entire length and which is constructed for the linear adjustment of slide unit 95, and a cable towing or drag member, e.g. a drag chain 150, which is in operative connection with slide unit 95.

Carrier member 10 shown in cross-section and on a larger scale in FIG. 3 has a first, lower base 12, to which are connected two spaced, roughly vertical side walls 13, 14. An upper base 16 shaped onto one side wall 13 in the upper region slopes downwardly with respect to the lower base 12 and is connected to a wall piece 16' extended substantially at right angles thereto and connected to the other, vertical side wall 14. Upper base 16 with wall piece 16' and a portion 16" extending in parallel with respect to base 16 together form a guideway 15 extending over the entire length of carrier member 10. The pocket-like guideway 15 is constructed for receiving the drag chain 150 diagrammatically and partly shown in FIG. 3. By means of the guideway 15 correspondingly arranged in carrier member 10, a space-saving inclined position and optimal guidance of drag chain 150 in carrier member 10, protected against external action, is ensured. In the upper region of the two side walls 13,14, are provided laterally projecting base parts 17,19 extending at right angles thereto. Further side walls 18,20 extending approximately at right angles to base parts 17,19 are stabilized by correspondingly arranged cross-struts 17',19' Parallel to the first lower base 12, is provided in the lower region of carrier member 10, a second lower base 11 located in the outer region of side walls 13,14 but not connected to the latter, so that pocket-like chambers 11', 11" are formed between the first lower base 12 and the second lower base 11. Chambers 11',11" preferably extend over the entire length of carrier member 10 and whose use will be described hereinafter. For stabilizing the carrier member 10 are provided further intermediate walls or partitions 13',14' extending from the upper base 16 assuming an inclined position to the second, lower base 11 and arranged in spaced manner with respect to the side walls 13,14. The carrier member 10, the shape of which has been described hereinbefore and which essentially comprises bases 11,12,16,17 and 19 and walls 13,13', 14,14' 18 and 20, forms a rigid cellular structure and is preferably constructed as a one-piece profile member which may be made in a per se known extrusion process, e.g. from light metal, preferably aluminum.

As shown in FIG. 3, a guide member 25, 26 is arranged on either side of the carrier member 10. Each guide member extends in not shown manner over the entire length of the latter. Each individual guide member 25,26 arranged below the upper base parts 17,19 and constructed in the front area as a round section 25',26' is detachably fixed by non-shown means to the side walls 13,14 of carrier member 10 and is essentially used for the displaceable mounting and linear guidance of slide unit 95.

On the laterally projecting base part 19 of carrier member 10, is provided a rack 30, which extends over the entire length of carrier member 10 and is detachably fixed by not shown means to the base part 19.

Slide unit 95 arranged on carrier member 10 and being in operative connection with rack 30 fixed to base 19 comprises, as shown in FIG. 3, a head which is U-shaped in cross-section and substantially engages the carrier member 10 with two parallel legs 37,38 and an intermediate piece 40 interconnecting the two legs 37,38. Head 35 essentially serving as a holder for a driving unit 45 has on the inside on each of the legs 37,38 at least one bearing part 36,39 provided with corresponding, not shown sliding members. The individual, claw-like bearing part 36 or 39 engaging the guide member 25 or 26 is detachably fixed by means of screws 34,34' to legs 37,38 of head 35, as shown on one side of FIG. 3.

In a further, not shown embodiment in each case two and preferably several, spaced bearing parts 36,39 constructed as sliding bearings (ball, needle or similar bearings) are provided on the legs 37,38 of head 35, said bearings 36,39 ensuring an optimal, i.e. easy-action adjusting movement of the complete slide unit 95 in arrow direction Y' (FIGS. 1 and 2). The bearing parts 36,39 can also be constructed in one piece and extend over the entire length of the head 35 in movement direction Y' (FIG. 2).

As stated hereinbefore, the intermediate piece 40 of the U-shaped head 35 is constructed for receiving and fixing the driving unit 45. The latter essentially comprises a casing 50, which is constructed for receiving and mounting one, or as diagrammatically shown in FIG. 2, several drives 60,61,62 and 63. The drives or motors 60 to 63, preferably constructed as direct current motors, are successively arranged in parallel to each other and are mounted in the side walls 51,52 of casing 50. On one side facing the rack 30, each individual motor 60,61,62,63 is operatively connected to rack 30 by means of a not shown shaft and a respective pinion 60',61',62',63' correspondingly arranged on said shaft. FIG. 2 also shows diagrammatically a path measuring device 64 mounted in casing 50 and which also engages via a pinion 64' with rack 30.

The approximately U-shaped casing 50 for mounting drives 60 to 63 has, as shown partly in FIG. 3, an intermediate piece 53 constructed as an upper cover and interconnecting two walls 51,52 of casing 50. On the intermediate piece 53 is formed a T-shaped portion oriented in the longitudinal direction (FIG. 2) of casing 50 and constituted by a web 55 with a flange 54, whilst a further web 56 forms a front end (FIG. 3). Casing 50, which is constructed, for example, as a one-piece aluminum casting is arranged with the flange 54 in a recess 42 provided in head 35 and extended in the longitudinal direction and, as shown in FIG. 3, is fixed by means of screws 41,41', so that head 35 with the driving unit 45 comprising parts 50 and 60 to 64 forms a subassembly.

As is also shown in FIG. 2, at one end of the casing 50, is provided a diagrammatically shown distributor member 70 fixed to flange 54 and which has a first connection 71 for connecting thereto a hydraulic or pneumatic line, and a second connection 72 for connecting thereto an electric line. The individual, not shown lines for energy and signal transmission are led essentially by means of the drag chain 150 to casing 50 or driving unit 45.

To ensure that no unintentional, external action or intervention in the moving parts is possible, as shown in FIGS. 2 and 3, protective members 75,75' and 80,80' are provided, which are constructed as hollow bodies with several, not specified chambers and which are detachably connected by any suitable non-shown means, preferably by a clamping connection to carrier member 10. The protective members 75,75' arranged in the upper area on either side of carrier member 10 and which, apart from a gap 76 constructed for the web 55 of casing 50, largely embrace the carrier member 10 are e.g. clipped to the side walls 18,20 and to the lower side of base parts 17,19. The protective members 80,80' arranged in the lower region on either side of carrier member 10 are secured in the pocket-like chambers 11,11'. The protective members 75,75' and 80,80' extending over the entire length of carrier member 10 are so arranged with respect to one another and fixed to the carrier member 10, that on the one hand, the gap 76 or web 55 of casing 50 and, on the other hand, on either side of the carrier member 10, a gap 77 or 78 for the bearing parts 36,39, arranged and fixed on head 35 are formed, so that as shown in FIGS. 1 and 2 by arrow direction Y', the slide unit 95 is freely displaceable in the longitudinal direction of guideway 94.

The protective members 75,75' and 80,80' constructed as profile hollow bodies and internally subdivided by several spaced ribs and webs are made, for example, from plastic and form an inherently stable unit. The chambers formed as a result of the ribs and webs in protective members 75,75' and 80,80' can be filled with a suitable plastic for damping any vibrations which occur, which leads to an additional stability of the individual protective members.

In a not shown variant for protecting against unintentional, external action, the possibility exists to extend upwards the two side walls 18,20 of carrier member 10 over and beyond the entire length with respect to base parts 17,19 and to arrange or shape thereon, a corresponding, inwardly directed cover, whilst maintaining gap 76. The lower region of the carrier member 10 can be constructed in the same way, so that the carrier member with the individual functional parts, which in this embodiment must be introduced from the front end, forms a closed subassembly.

FIG. 4 shows a modified slide unit 95' in sectional view. The carrier member 10 is shown with the protective members 75,75' and 80,80' arranged on either side, the drag chain 150 being arranged and mounted in pocket 15, and head 35 being essentially mounted with parts 36,39 on guide members 25,26.

Unlike in the first embodiment according to FIG. 3, in this embodiment the driving unit is a single direct current motor 85 arranged externally on head 35 and operatively connected therewith by any conventional suitable means. Motor 85 has a shaft, which passes through the intermediate piece 40 of head 35 provided with a respective bore 43. A pinion 83 is arranged on shaft 84 in the interior of head 35 and is mounted in a diagrammatically shown casing 68. Pinion 83 operatively connected to shaft 84 is in engagement with a rack 31, which is arranged on a block-like rail 32 fixed to the base part 19 of carrier member 10. The two parts 31,32 extending over the entire length of carrier member 10 can also be constructed in one piece and detachably fixed to base part 19 by any suitable fastening means.

It is pointed out at this point that all not further defined parts in FIG. 4 are identical with the corresponding parts of FIG. 3 and are consequently not additionally shown in FIG. 4 for the sake of clarity.

The electric/pneumatic or electric/hydraulic energy supply required for operating slide unit 95 or 95' essentially is carried out means of corresponding non-shown connections provided on the carrier member 10 of the particular guideway. Not shown, flexible lines led up to the carrier member 10 from the outside are received by the drag chain 150 which, within the guideway 15, essentially forms a loop-like space 150 and is fixed, on the one hand, to a corresponding point of carrier member 10 and, on the other hand, to the slide unit. The drag chain 150 comprising a plurality of articulated, interconnected links, preferably plastic links, ensures in the case of relatively rapid movements a completely satisfactory rolling of the lines arranged within the drag chain 150.

The lines supplied to the casing 50 or 68 by the drag chain 150 are preferably connected to the front end of the respective casing. In this area the drag chain 150 is also preferably operatively connected to the casing. By means of a duct system 57 (FIG. 3) arranged in casing 50 or 68 and which has several not shown oars or the like passing through the webs and walls of the casing, energy or signals are supplied, on the one hand, to motors 60,61,62,63, or 85 and, on the other hand, to the distributor member 70 arranged in the front region of the casing.

As a result of this special, essentially integrated energy and signal supply, there is no possibility of unintentional action or intervention in moving elements. The energy and signal supply to a peripheral device can essentially take place by direct connection to the block-like distributor member 70, so that fault-prone, flexible lines are no longer necessary.

What is claimed is:

1. Apparatus for a handling assembly system, comprising a carrier member formed as a guideway, and at least one slide unit linearly movable and adjustable thereon, said slide unit being operatively connected by means of a cable drag member with an energy and signal source, said slide unit being formed as an attachment to the carrier member, the carrier member being formed by a one-piece rigid cellular structure formed of spaced base portions and side walls passing through the carrier along the length thereof and being limited by spaced-apart upper and lower side walls, said carrier member including a guideway for receiving the cable drag member passing through the entire length of the carrier member, a base connected to one side of the guideway for receiving a rack and guide members for mounting the slide unit, said guide members being arranged laterally on two lower side walls, and the slide unit including a casing for receiving a drive unit which is in operative connection with the rack, and a head for receiving the casing, said head being of U-shaped cross-section for substantially surrounding the casing and the carrier member and having two lateral legs displaceably mounted on the guide members of the carrier member.

2. Apparatus according to claim 1, wherein the guideway is formed as a pocket and is located in the carrier member so that the cable drag member received in the guideway has an inclined position.

3. Apparatus according to claim 1, wherein the carrier member comprises a substantially horizontal lower base and an upper base spaced from each other by the lower side walls said upper base including a central portion, substantially horizontal portions and inclined portions, the central portion being shaped onto one of the horizontal portions and sloping downwards towards the lower base for forming the guideway and being connected to one of the inclined portions which is arranged substantially at right angles thereto.

4. Apparatus according to claim 3, wherein the guide members are spaced from and arranged below the substantially horizontal portions of the upper base.

5. Apparatus according to claim 1, wherein said head has an intermediate part interconnecting the two lateral legs, said casing being mounted on said head and receiving at least one motor operatively connected to a pinion engaging with the rack.

6. Apparatus according to claim 5, wherein direct current motors are arranged in series in the casing.

7. Apparatus according to claim 6, wherein the casing with the motors forms a subassembly and has a T-shaped portion formed on an upper casing part, said T-shaped portion being detachably fixed to an intermediate part of the head.

8. Apparatus according to claim 7, and further including a distributor and connecting member arranged externally of the head and detachably fixed to a flange of the T-shaped portion, and a duct system arranged in the casing for the energy and signal supply, said distributor and connecting member being connected to said duct system.

9. Apparatus according to claim 7, and further including bearing elements for said guide members and upper protective members arranged on each side of the carrier member, whereby in an assembled state said protective members form therebetween in an upper central region thereof a gap for the T-shaped portion extending in a longitudinal direction of the carrier member, said protective members extending laterally into an area of said bearing elements which are arranged on the head.

10. Apparatus according to claim 9, wherein laterally in a lower region of the carrier member are provided two further protective members having vertical portions which extend approximately into an area of the bearing elements and together with the upper protective members form at each side of said head a gap extended in the longitudinal direction of the carrier member for accommodating the bearing elements.

11. Apparatus according to claim 10, wherein the protective members are detachably fixed to the carrier member.

12. Apparatus according to claim 10, wherein the protective members are made from a suitable plastic and cavities in the individual protective members formed by ribs and webs are foam-filled.

13. Apparatus according to claim 9, wherein two upper side walls of the carrier member support said upper protective members which form in the upper region of the carrier member said gap.

14. Apparatus according to claim 1, wherein the carrier member is provided with individual protective members and the slide unit is formed from individual functional parts, and wherein said carrier member, said slide unit and the energy and signal source are constructed as a closed system protected against external action.

15. Apparatus according to claim 1, wherein said slide unit is electrically and pneumatically connected with said energy and signal source.

16. Apparatus according to claim 1, wherein said slide unit is electrically and hydraulically connected with said energy and signal source.

* * * * *